United States Patent
Anaba Anaba et al.

(10) Patent No.: US 12,269,230 B2
(45) Date of Patent: Apr. 8, 2025

(54) INSTALLATION AND PROCESS FOR THE PREPARATION AND FIXATION OF ELECTRONIC COMPONENT FASTENING DEVICES TO TIRE CASINGS

(71) Applicant: COMPAGNIE GENERALE DES ETABLISSEMENTS MICHELIN, Clermont-Ferrand (FR)

(72) Inventors: Georges Anaba Anaba, Clermont-Ferrand (FR); Fabien Bard, Clermont-Ferrand (FR); Francis Carteron, Clermont-Ferrand (FR); Lucie Chevrel, Clermont-Ferrand (FR); Antoine Holtzhauer, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 115 days.

(21) Appl. No.: 18/020,483

(22) PCT Filed: Jul. 26, 2021

(86) PCT No.: PCT/EP2021/070867
§ 371 (c)(1),
(2) Date: Feb. 9, 2023

(87) PCT Pub. No.: WO2022/033854
PCT Pub. Date: Feb. 17, 2022

(65) Prior Publication Data
US 2023/0286235 A1 Sep. 14, 2023

(30) Foreign Application Priority Data
Aug. 13, 2020 (FR) ...................................... 2008481

(51) Int. Cl.
*B29D 30/00* (2006.01)

(52) U.S. Cl.
CPC .. *B29D 30/0061* (2013.01); *B29D 2030/0072* (2013.01)

(58) Field of Classification Search
None
See application file for complete search history.

(56) References Cited

U.S. PATENT DOCUMENTS 6,309,494 B1 10/2001 Koch et al.
10,994,494 B2 5/2021 Clark et al.
(Continued)

FOREIGN PATENT DOCUMENTS

EP 1604809 A1 12/2005
EP 2797760 B1 6/2018
(Continued)

OTHER PUBLICATIONS

International Search Report dated Oct. 18, 2021, in corresponding PCT/EP2021/070867 (2 pages).

*Primary Examiner* — Jacob T Minskey
*Assistant Examiner* — Adrianna N Konves
(74) *Attorney, Agent, or Firm* — VENABLE LLP

(57) ABSTRACT

Disclosed is a preparation and fixation installation (100) for fixation of a fastening device (10) to an inner surface (50*a*) of a tire casing (50), the fastening device allowing mounting of a corresponding electronic component therein. The system includes a positioning device (200) and an affixing device (300). The affixing device includes a robot (302) having a gripping device (304) and a gripper (308) disposed along a longitudinal axis l-l at a free end (304*a*) of the gripping device. The gripper includes a housing (320) with a fixed housing (328) and a sliding housing (330), and a docking finger (324) having a longitudinal axis in common with the longitudinal axis of the gripper, such that reciprocating movement of the finger effects engagement of a center (Continued)

(C) of the fastening device (10) that is aligned along the longitudinal axis of the finger when a vacuum is applied.

11 Claims, 9 Drawing Sheets

(56) References Cited

U.S. PATENT DOCUMENTS

| | | |
|---|---|---|
| 11,065,924 B2 | 7/2021 | Barjon et al. |
| 11,511,573 B2 | 11/2022 | Barjon et al. |
| 2014/0360019 A1* | 12/2014 | Brusarosco ........... B60C 25/005<br>29/894.3 |
| 2019/0255782 A1 | 8/2019 | Clark et al. |
| 2019/0381841 A1 | 12/2019 | Barjon et al. |
| 2020/0055354 A1 | 2/2020 | Barjon et al. |

FOREIGN PATENT DOCUMENTS

| | | |
|---|---|---|
| FR | 3079767 A1 | 10/2019 |
| WO | 2018/150140 A1 | 8/2018 |
| WO | 2018/150141 A1 | 8/2018 |
| WO | 2019/161368 A1 | 8/2019 |

\* cited by examiner

INSTALLATION AND PROCESS FOR THE PREPARATION AND FIXATION OF ELECTRONIC COMPONENT FASTENING DEVICES TO TIRE CASINGS

TECHNICAL DOMAIN

The invention relates to the fixation of fastening devices that can contain electronic components to pneumatic casings. More particularly, the invention relates to a preparation and fixation installation that allows an optimized placement and a secure fixation of a fastening device inside a corresponding tire, without reducing industrial productivity.

BACKGROUND

In the field of tire manufacturing, there are already electronic components integrated into assemblies including a tire envelope (or "casing") and a wheel. One or more electronic components are attached to the inside of a casing by means of a fastening device 10, which is shown in FIG. 1. The fastening device 10, which is given as an example, represents a fastening device for an electronic element of the TMS (or "tire-mounted system") type. The fastening device 10 includes a sole 12 having a front surface 12a that is attached to the selected casing and an opposite top surface 12b. The fastening device 10 also includes a retaining wall 14 that extends from the top surface 12b of the sole 12 and terminates in an opening 16. The opening 16 may widen to generate a space S sufficient to insert and extract an electronic element within the fastening device 10. The space S is bounded by a bottom 12c that is part of the sole 12 and also by an inner wall 14a of the retaining wall 14. An axis of rotation X-X, which defines the vertical direction in the local reference frame of the fastening device, passes through a center C of the bottom 12c. The fastening device 10 is made of an elastomeric material (e.g., a natural rubber, a synthetic elastomer, and combinations and equivalents thereof). The term "elastomer" is used here to refer to all elastomers including TPEs (acronym for "thermoplastic elastomers"), such as, for example, diene polymers, i.e., comprising diene units, silicones, polyurethanes and polyolefins. These mixtures allow for communication performance of the electronic device, and they have a natural flexibility allowing for elastic deformation of the fastening device. Examples of the electronic element fastening devices are known in the prior art, examples being represented by the Applicant's publications WO2018/150140 and WO2018/150141 and the European patent EP2797760.

Thus, there are associated processes that allow for the installation of the different fastening devices in tire casings. For example, U.S. Pat. No. 6,309,494 discloses a process for bonding a fastener to a predetermined location of a roughened tire casing prior to application of an adhesive that will bond the electronic element (being a monitoring device). Also, EP1604809 discloses a process for preparing and positioning a surface of a pneumatic casing to perform installation of a fastening device. Also, publication WO2019/161368 discloses a process for installing a fastening device to an inner surface of a pneumatic casing to perform installation of a fastening device. The disclosed process involves robots to process an inner surface of the casing, to select and position the fastening device to be installed, and to apply sufficient pressure to the fastening device to ensure its bonding to the inner surface of the casing.

In order to achieve industrial productivity, it is still necessary to master all steps of a process of fixation of a fastening device. Thus, the disclosed invention combines the control of the positioning of the casing and the fastening device with respect to each other. A reliable fixation is thus ensured between cycles of the installation of the fastening devices by preserving their inviolability and by preserving the functionalities of the electronic elements potentially located in the fastening device.

SUMMARY OF THE INVENTION

The invention is directed to a preparation and fixation installation for fixation of a fastening device to an inner surface of a tire casing, the fastening device having a substantially cylindrical flange with respect to a center through which an axis of rotation passes, the flange having a front surface and an opposite top surface from which a retaining wall extends and terminates in an aperture permitting mounting of an electronic element in a space bounded by a base and an inner wall, characterized in that the installation includes:
  a positioning device that manages the positioning of the casing, the positioning device having a fixed support and one or more rotating means that guide the rotation of the casing about its axis of rotation; and
  a fixation device that performs fixation of the fastening device to a predetermined location on the interior surface of the casing, the fixation device including:
  a robot having a gripping device supported by an elongated pivotal arm and extending from the elongated arm to a free end; and
  a gripper disposed along a longitudinal axis at the free end of the gripper device that effects movement of the fastening device between a standby position, where the gripper holds the fastening device by its holding wall without deformation, and a docking position, where the gripper moves the fastening device toward the casing to effect docking thereof at the predetermined location of the interior surface of the casing, the gripper including:
  a housing having a fixed housing and a sliding housing disposed along the longitudinal axis of the gripper, the housing having a predetermined length between an attachment end, where removable attachment of the housing to the robot is effected, and a docking end, where docking of the attachment device to the casing is effected; and
  a docking finger having a longitudinal axis in common with the longitudinal axis of the gripper, the finger having a predetermined length that extends between an actuation end, where reciprocating movement of the finger is performed, and an opposite deformation end, where engagement is performed between the finger and the center of the fastening device aligned along the longitudinal axis of the finger when the gripper is idle.

In some embodiments of the installation, the fixed housing of the housing extends between the fastening end of the housing and an opposite end to define a space into which the sliding housing extends and into which a control actuator is disposed that reciprocates to effect a corresponding movement of the sliding housing, along the longitudinal axis, between an extended position, where the sliding housing extends relative to the fixed housing, and a retracted position, where the sliding housing retracts relative to the fixed housing; and the sliding housing of the housing extends into the space of the fixed housing between an activation end deposited adjacent the opposite end of the fixed housing and the docking end to define a space in which the finger extends and in which a deformation actuator is disposed that reciprocates to effect a corresponding movement of the finger between a gripping position, where the fastening device is held by the gripper in the standby position, and a deformation position, where the finger engages the center of the fastening device.

In some embodiments of the installation, the gripper further includes a gripper chamber deposited at the docking end of the housing, the gripper chamber including:
- a substantially cylindrical member that extends between an attachment end, where the gripping chamber engages the docking end of the housing, and a deformation end having a footprint where the gripper makes contact with the upper surface of the sole of the fastening device; and
- a central conduit having a longitudinal axis in common with the longitudinal axes of the gripper and the finger, and wherein the central conduit allows free movement of the finger between the gripping position and the deformation position of the finger, such that the positioning of the finger relative to the central conduit allows a profile in the gripping chamber to be defined corresponding to the profile of the retaining wall of the fastening device.

In some embodiments of the installation, the fixation device further includes a vacuum control system including:
- at least one vacuum generator that supplies vacuum to the gripper;
- one or more manifolds that control the delivery of the vacuum to the gripper; and
- one or more pressure regulators that allow adjustment of the pressure of the vacuum supplied to the gripper.

In some embodiments of the installation, the rotating means includes a lower roller or rollers on which the casing is mounted and an upper roller or rollers held in an elevated position by a frame of the fixed support, with each lower and upper roller assuming a substantially conical geometry that engages a respective sidewall of the casing.

In some embodiments of the installation, the positioning device further includes at least one treatment means that treats the inner surface of the casing and the front surface of the sole of the fastening device in advance of a contact between the two.

In some embodiments of the system, the processing means includes at least one laser and means for suctioning dust associated with the laser processing.

The invention also relates to a fixation process performed by the disclosed installation, the fixation process including the following steps:
- a step of positioning the casing during which the casing is installed at the positioning device in a substantially rotatable manner where the casing assumes an intended position;
- a moving and holding step during which the robot performs an alignment between the front surface of the sole of the fastening device and the predetermined location of the inner surface of the casing, this step including a step of moving the gripper between the standby position and the docking position; and
- a bonding step in which a predetermined amount of adhesive is applied to the front surface of the sole of the fastening device; and
- a deforming step during which the finger is moved to deform the fastening device, this step being performed after the moving and holding and bonding steps;
- a docking and positioning step in which the robot positions the gripper on the casing with the finger extended so that the finger can engage the center of the fastening device; and
- a step of resuming the waiting position performed by the gripper, during which the finger remains in the gripping position and the gripper releases the holding wall of the fastening device;
- such that the gripper is lacks a vacuum for the duration of the process until the recovery step.

In some embodiments of the process, the docking and placement step includes the following steps:
- a step of pressing the fastening device along a circumferential perimeter of the sole; and
- a rotation step during which the robot rotates the gripper to distribute the adhesive applied to the front surface of the fastening device, this step being performed while the fastening device is being pressed.

In some embodiments of the process, the process further includes a preparation step during which the inner surface of the casing and the front surface of the sole of the fastening device are treated by a treatment means including at least one laser.

In some embodiments of the process, one or more steps of the process are performed iteratively.

Other aspects of the invention will become apparent from the following detailed description.

BRIEF DESCRIPTION OF THE DRAWINGS

The nature and various advantages of the invention will become more apparent from the following detailed description, in conjunction with the accompanying drawings, in which the same reference numerals designate identical parts throughout, and in which.

DETAILED DESCRIPTION

Figure 1:
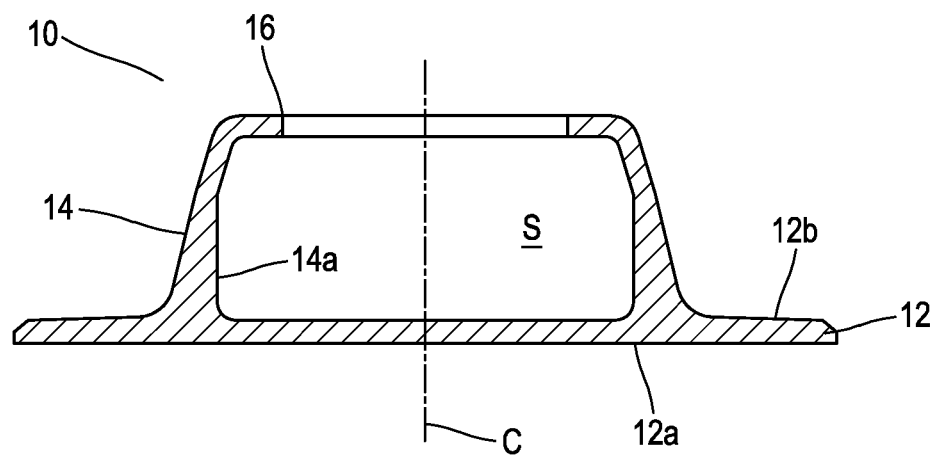
FIG. 1 represents a cross-sectional side view of an embodiment of a fastening device intended for fixation in a tire casing.

Referring now to the figures, in which the same numbers identify identical elements, FIG. 1 represents an embodiment of a preparation and fixation installation (or "installation") 100 of the invention. The installation 100 includes a positioning device 200 for controlling the positioning of a pneumatic envelope (or "casing") 50 during an application process performed by the installation. The installation 100 also includes a fixation device 300 for controlling the positioning and fixation of a fastening device 10 during a fixation process performed by the installation (see FIGS. 8 and 11 to 16). The installation 100 manages the relative positioning between the casing 50 and the fastening device 10 during the fixation process to ensure fixation of the fastening device at a predetermined location of an interior surface 50*a* of the casing.

Figure 2:
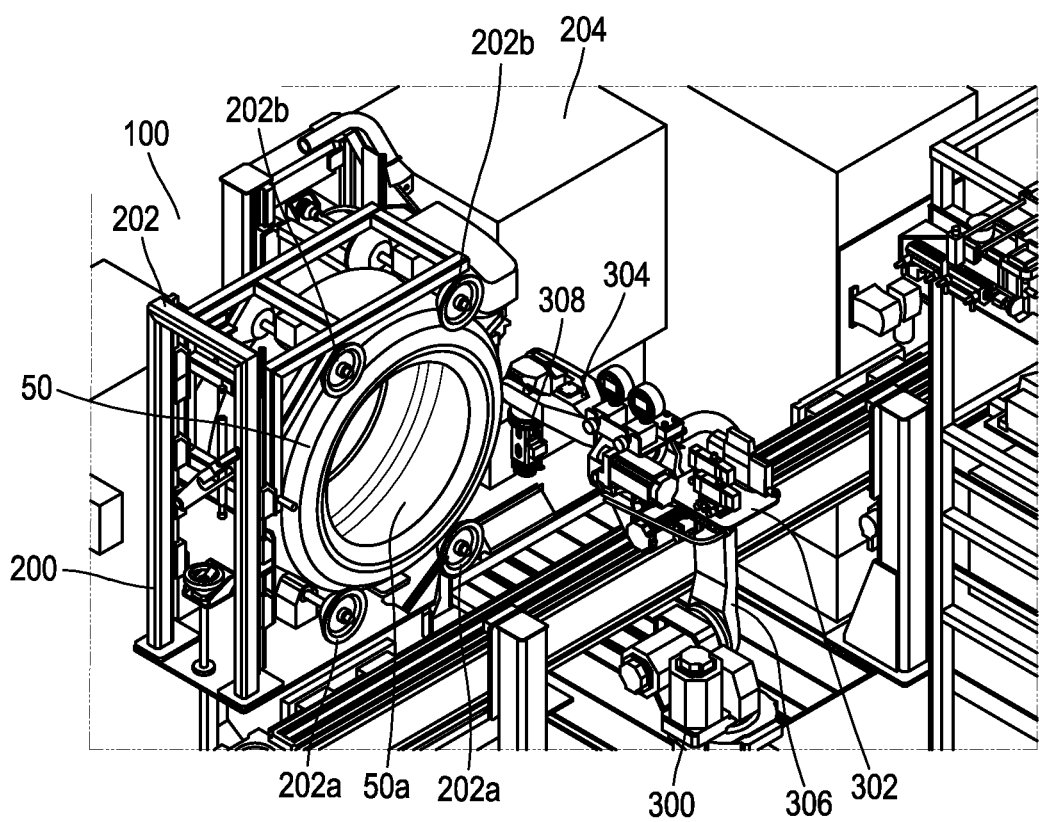
FIG. 2 represents a perspective view of an embodiment of a preparation and fixation installation of the invention.
Figure 3:
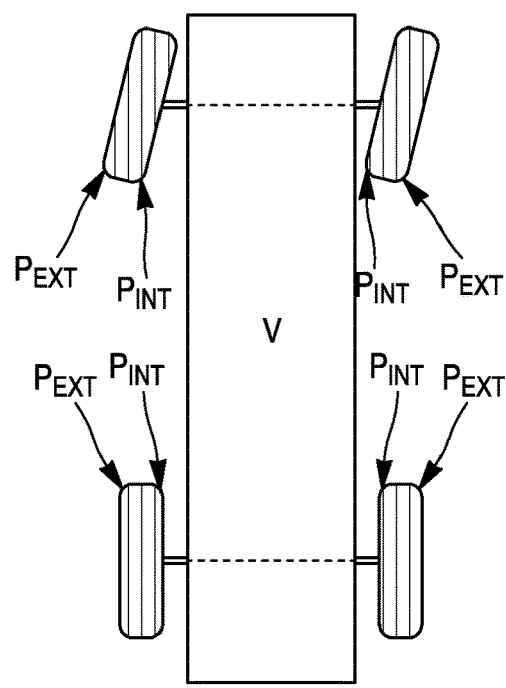
FIG. 3 represents a schematic view of tires as they are intended to be mounted.
Figure 4:
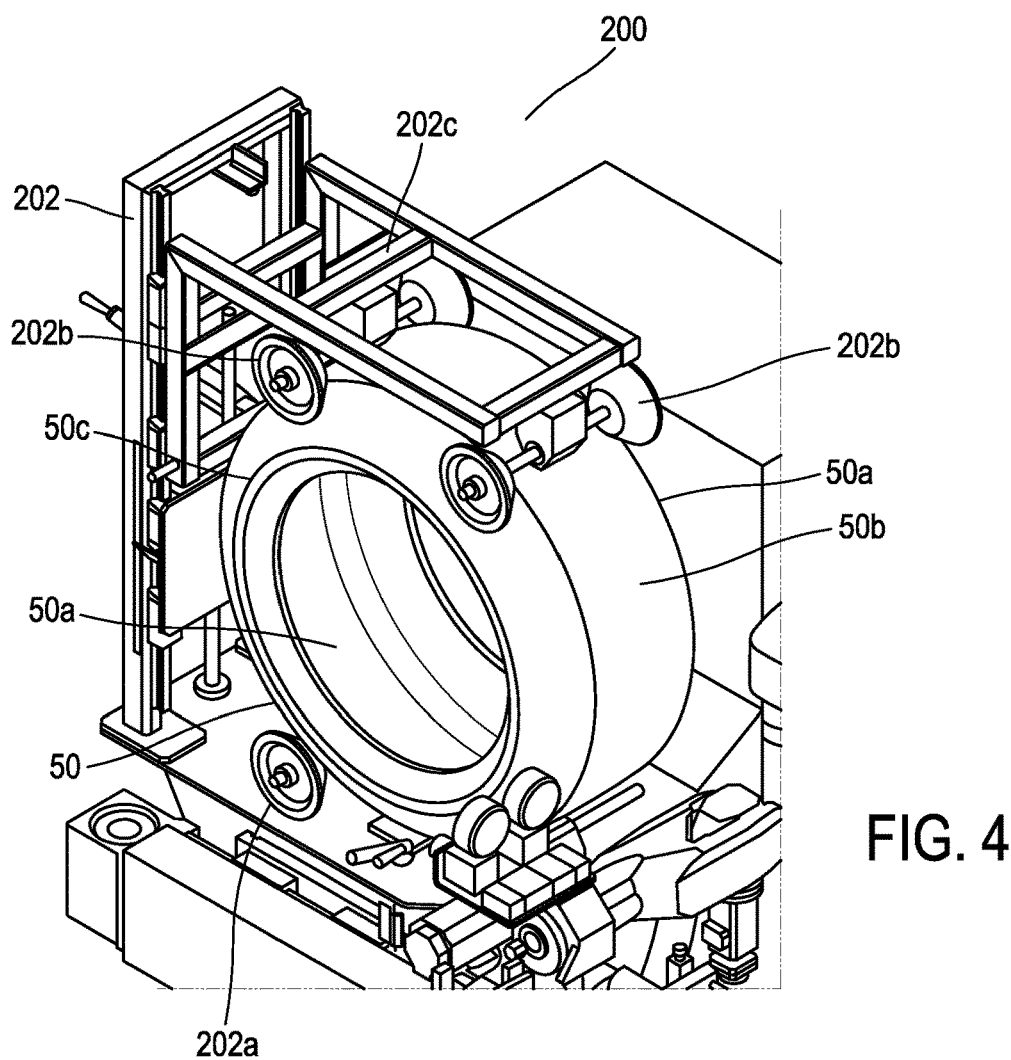
FIG. 4 represents a perspective view of a positioning device of the preparation and fixation installation of FIG. 2.
Figure 6:
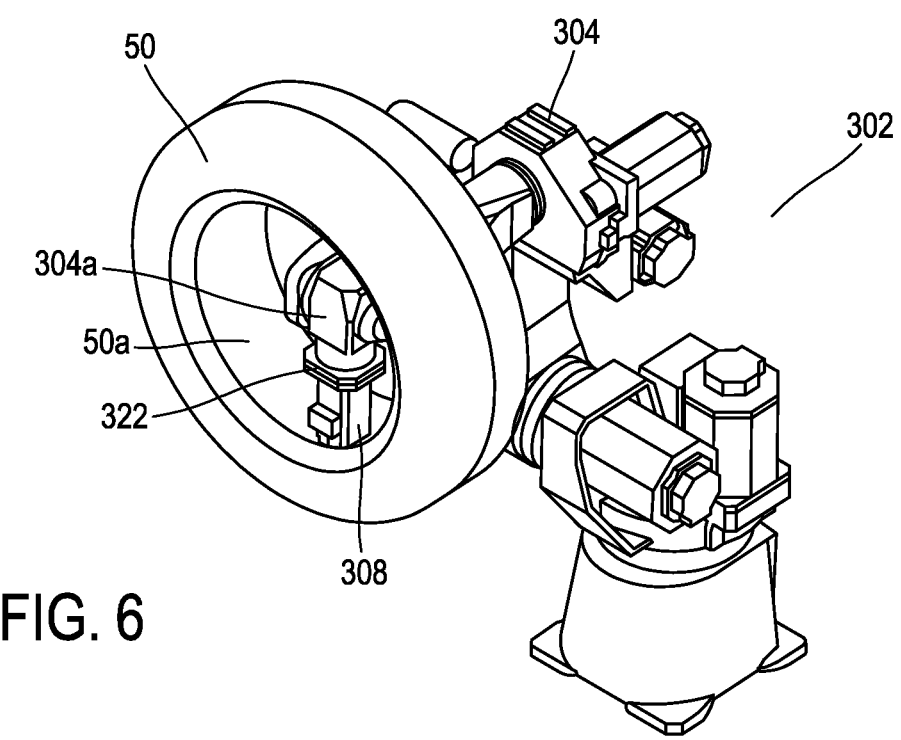
FIG. 6 represents a schematic perspective view of the preparation and fixation system of FIG. 2 with a gripper of the application device in a docking position.

Referring again to FIG. 2 and also to FIGS. 3, 4, and 6, the casing 50 includes a geometry known to the person skilled in the art, including a tread 50*b*, two sidewalls 50*c*, and two beads (not shown) reinforced with a bead core (not shown). A radial carcass ply extends from one bead to the other surrounding the bead core in a known manner. The crown 50*b* has reinforcements (not shown), consisting of, for example, superimposed plies having known reinforcing threads. For a tire having a geometry of revolution about an axis of rotation, the geometry of the tire is generally described in a meridian plane containing the axis of rotation of the tire. For a given meridian plane, the radial, axial and circumferential directions refer to the directions perpendicular to the axis of rotation of the tire, parallel to the axis of rotation of the tire and perpendicular to the meridian plane, respectively.

It is understood that the mounting direction of a tire casing on a vehicle is predetermined by the manufacturer. For this reason, the fastening device 10 is properly installed by the installation 100 regardless of the intended mounting direction. FIG. 3 schematically shows tires as they are intended to be mounted on wheel rims of a vehicle V, and which have a predetermined mounting direction on the vehicle: the inner side $P_{INT}$ of the tire corresponds to the inner axial side of the vehicle, and the outer side $P_{EXT}$ of the tire corresponds to the outer axial side of the vehicle. A user can then easily verify that the imposed mounting direction on a rim has been respected. As used here, "outer side of the vehicle" refers to the outer axial edge.

Referring again to FIG. 1 and also to FIGS. 8 through 16, the fastening device 10 is selected from fastening devices of the type shown in FIG. 1 (also referred to as "patches" in English). The fastening device 10 is adapted for mounting a corresponding electronic device therein. The electronic device mounted in the fastening device 10 measures parameters within a cavity formed by the casing 50 in an inflated state and a wheel rim (not shown) to which the casing is mounted. The parameters measured are selected from parameters deemed essential to safe use of the mounted assembly, which include, without limitation, tire pressure (including tire pressure variation), tire temperature (including tire temperature variation), wheel speed, acceleration (including acceleration variation), tread variation (including predicted tread wear), and related data (e.g., track test data that may be captured by each electronic device). Communication with these electronics (including communication of mounted assembly parameters) is typically via radio frequency transmission to transmitter/receiver devices (e.g., using radio frequency identification, or "RFID" type devices).

Referring again to FIGS. 1 and 2 and further to FIG. 4, the positioning device 200 of the installation 100 includes a fixed support 202 that controls the positioning of the casing 50 relative to the fixation device 300. The fixed support 202 includes one or more rotational means that engage the sidewalls 50*c* of the casing 50 and guide the rotation of the casing about its axis of rotation. The rotating means includes a lower roller or rollers 202*a*, on which the casing 50 is mounted, and an upper roller or rollers 202*b*, held in an elevated position by a frame 202*c* of the fixed support 202. Each roller 202*a*, 202*b* is rotatably supported by a respective axle that facilitates rotation of a corresponding roller. The lower rollers 202*a* and the upper rollers 202*b* are selected from known industrial rollers. In one embodiment of the positioning device, each lower roller 202*a* and each upper roller 202*b* takes on a substantially conical geometry (which may include a substantially frusto-conical shape) that engages a respective sidewall 50*c* of the casing 50 to maintain rotation of the casing about its axis of rotation.

To attain rotation of the casing 50 during the fixation process, the lower rollers 202*a* may be driven by a corresponding programmable drive motor(s) (not shown) that governs a rotational speed. Alternatively, a common drive system (e.g., a gear or belt or equivalent system) (not shown) may govern the rotation of the lower rollers (and thus the rotation of the casing 50). The positioning device may further include an optional control means (not shown) for controlling the rotational speed of the lower rollers, thus also controlling the rotational speed of the casing 50. The control means may also control the precise positioning of the casing 50 to permit a halt of rotation during the fixation process. For example, the rotation of the lower rollers 202*a* may be controlled by an encoder or a known equivalent device that is in signal communication with one or more processors (e.g., one or more programmable logic control, or "PLC" devices). The encoder may be an optical encoder that converts the rotary displacement of the casing 50 into digital signals or pulses. Thus, one or more profiles of the different pneumatic casings may be preprogrammed and may incorporate identical profiles multiple times and/or different profiles one after another.

The positioning device 200 may include a processing means 204 that processes the predetermined location of the inner surface 50*a* of the casing 50 where the fastening device 10 is intended to be fixed to the envelope. The interior surface 50*a* is treated so that an apposition target is established to receive the fastening device 10 in the casing 50. In one embodiment of the positioning device 200, the treatment means includes one or more lasers of the type known for treating and cleaning rubber surfaces (such as tires). It is understood that other treatment means may be employed, including, without limitation, chemical and/or mechanical treatments. It is also understood that one or more treatment means may be used to treat the inner surface 50*a* depending on the properties of the materials incorporated in the casing 50.

Figure 5:
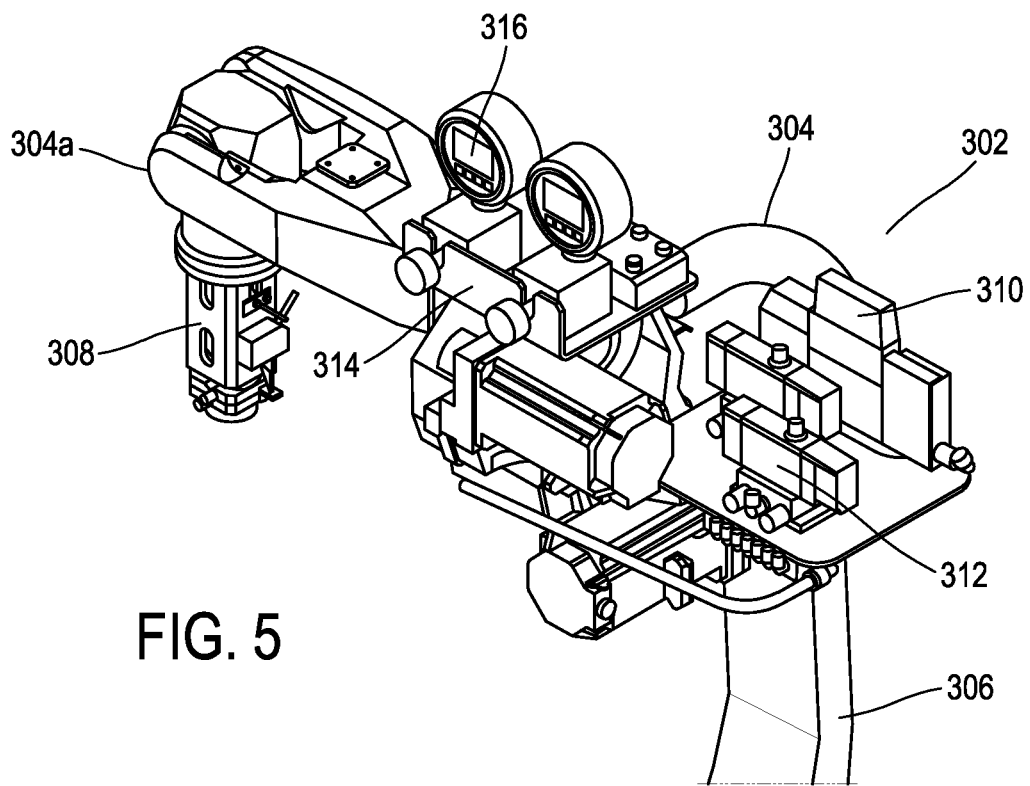
FIG. 5 represents a perspective view of a robot of an application device of the preparation and fixation installation of FIG. 2.

Referring again to FIGS. 1, 2, and 4, and further to FIGS. 5 and 6, the fixation device 300 of the installation 100 is a device that performs the mounting of the fastening device 10 to the inner surface 50*a* of the casing 50 (and particularly to the predetermined location on the inner surface).

The fixation device 300 includes a robot 302 having a gripping device 304 supported by an elongated pivotable arm 306. The gripping device 304 extends from the elongated arm 306 to a free end 304*a* where a gripper 308 is disposed along a longitudinal axis l-l (see FIG. 7). The fixation device 300 is disposed proximate to the positioning device 200 such that the gripper 308 reliably performs fixation of the fastening device 10 to the casing 50 positioned by the positioning device (as described below and as shown with respect to FIGS. 6, 8, and 11-16).

Through the supply of a pressurized fluid (e.g., a vacuum), the gripper 308 provides a grip for holding the fastening device 10 during its movement between a standby position (in which the gripper 308 holds the fastening device 10 by its holding wall 14 without deformation of the base 12) (see FIG. 2) and a docking position (in which the gripper 308 moves the fastening device 10 toward the casing 50 to dock it onto the predetermined location of the inner surface 50a) (see FIG. 6). The use of a vacuum (or an equivalent pressurized fluid) during the moving and holding phases of the fastening device 10 ensures that it is held with optimized accuracy and without degrading the fastening device.

The fixation device 300 also includes a vacuum control system that allows the fastening device 10 to be held during its movement between the standby position and the docking position. The vacuum control system includes at least one vacuum generator 310 that provides vacuum to the gripper 308, the vacuum being used only to lift and move the fastening device 10. The vacuum control system also includes one or more manifolds 312 that manage the delivery of vacuum to the gripper 308 during a fixation process performed by the installation 100 (for example, by pressurizing an actuator that obstructs a supply of vacuum from the vacuum generator 310). The vacuum control system may also include one or more pressure regulators 314 that allow for an adjustment of the vacuum pressure supplied to the gripper 308. In one embodiment of the fixation device 300, the vacuum control system includes optional precision gauge(s) 316 that show the pressure of the vacuum supplied to the gripper 308 during a fixation process performed by the installation 100.

Figure 7:
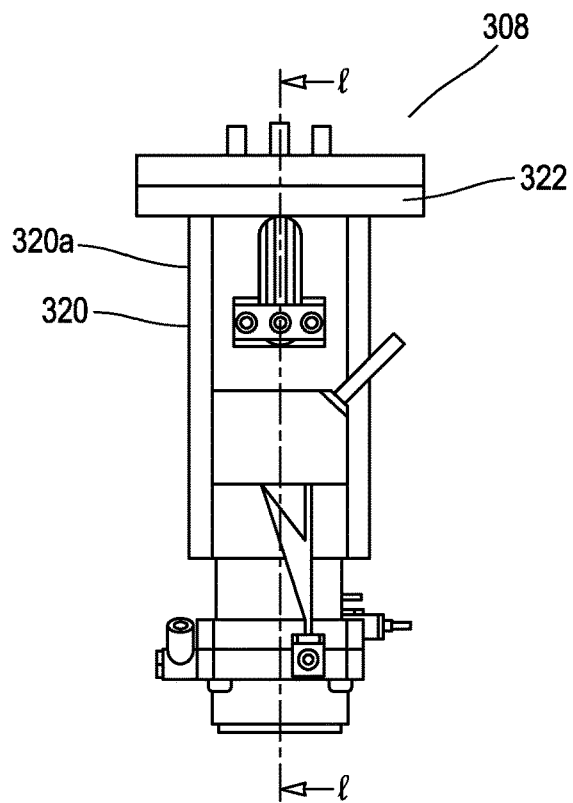
FIG. 7 represents a perspective side view of a gripper of the application device.
Figure 8:
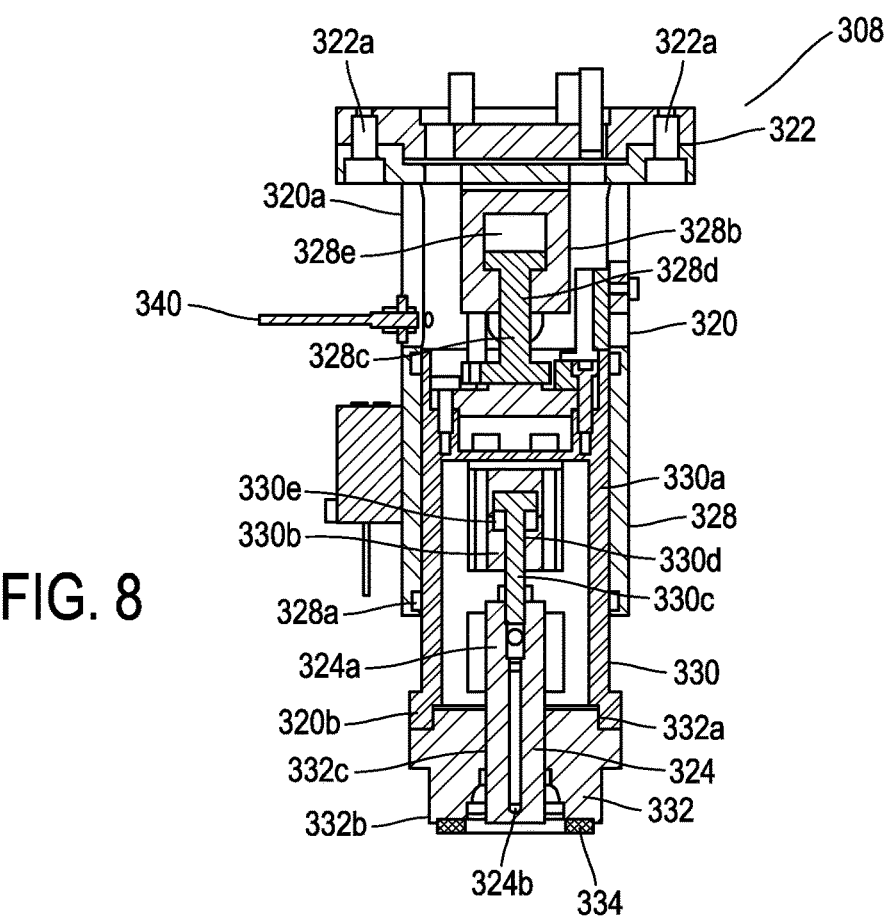
FIG. 8 represents a cross-sectional side view along a longitudinal axis of the gripper in FIG. 7.
Figure 9:
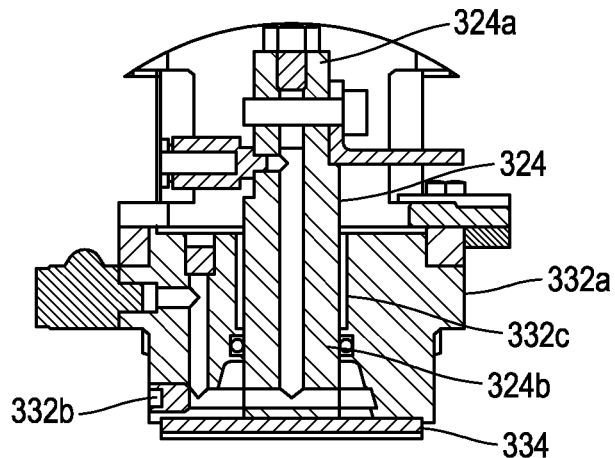
FIG. 9 represents is a partial cross-sectional view of the view in FIG. 8.
Figure 10:
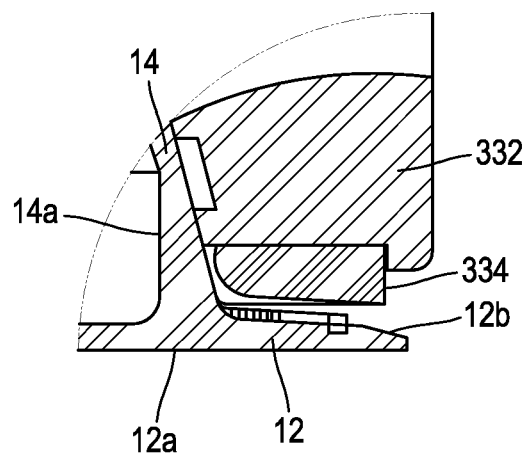
FIGS. 10, 10A, 10B, and 10C represent embodiments of a footprint of the gripper of FIGS. 7 through 9.
Figure 10A:
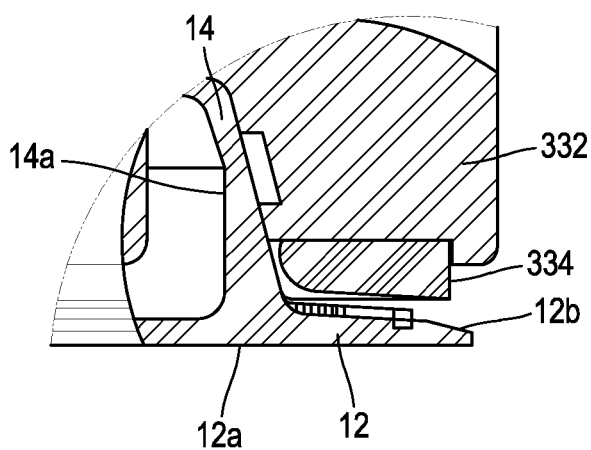
Figure 10B:
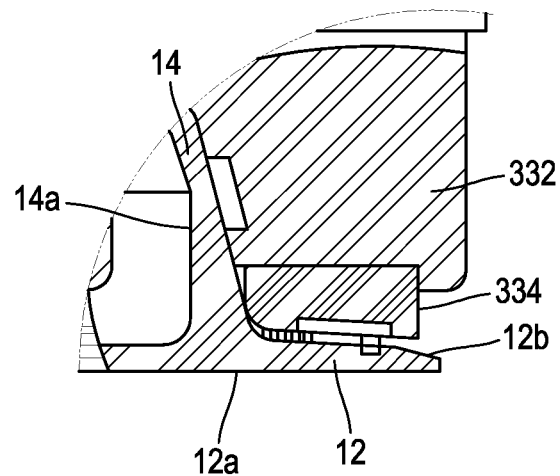
Figure 10C:
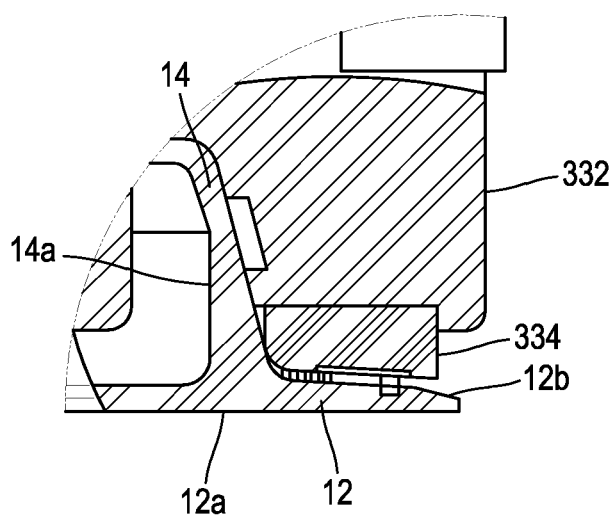

Referring further to FIGS. 7 to 9, one embodiment of the gripper 308 includes a housing 320 having a predetermined length between an attachment end 320a and a docking end 320b. The attachment end 320a may include an adapter 322 that allows for removable attachment of the housing to the robot 302 of the fixation device 300. The attachment of the housing 320 to the robot 302 may be accomplished by screwing the adapter 322 to the free end 304a of the gripping device 304 (accomplished by a known screw or screws 322a). It is understood that the attachment of the housing 320 to the robot 302 may be accomplished by any known equivalent attachment means (including, without limitation, welding, gluing, and the like).

The gripper 308 further includes a docking finger (or "finger") 324 that is reciprocated in the housing 320 during a fixation process of the invention performed by the installation 100. The finger 324 includes a substantially cylindrical member having a longitudinal axis in common with the longitudinal axis l-l of the gripper. The finger 324 has a predetermined length that extends between an actuation end 324a (where the reciprocating movement of the finger is performed) and an opposite deformation end 324b (where the finger engages the fastening device 10 retained by the gripper during the fixation process). In embodiments of the gripper 308, the finger 324 may be made of a flexible material (e.g., an elastomeric material) that matches the flexibility of the fastening device 10 made of an elastomeric material.

The housing 320 includes a fixed housing 328 and a sliding housing 330 disposed along the longitudinal axis l-l of the gripper 308. The fixed housing 328 of the housing 320 extends between the attachment end 320a and an opposite end 328a to define a space into which the sliding housing 330 extends and into which a control actuator 328b is disposed. The control actuator 328b includes a piston 328c with a rod 328d and a chamber 328e in which the piston 328c reciprocates. This motion effects corresponding movement of the sliding housing 330, along the longitudinal axis l-l, between an extended position (where the sliding housing extends relative to the fixed housing) (see FIG. 12) and a retracted position (where the sliding housing retracts relative to the fixed housing) (see FIG. 14) during the fixation process.

The sliding housing 330 extends into the fixed housing 328 between an activation end 330a (which is deposited adjacent to the opposite end 328a of the fixed housing 328) and the docking end 320b of the housing 320 to define a space into which the finger 324 extends and into which a deformation actuator 330 is disposed. The deformation actuator 330b includes a piston 330c with a rod 330d and a chamber 330e in which the piston 330c reciprocates. This reciprocating motion effects the corresponding movement of the finger 324 between a gripping position (where the fastening device 10 is held by the gripper 308 in the standby position) (see FIGS. 7-9 and 11, 15 and 16) and a deformation position (where the finger 324 engages the bottom 12c at the center C of the fastening device 10) (see FIGS. 12, 13 and 14) during the fixation process.

The control and deformation actuators 328c, 330c are selected from commercial actuators.

Referring again to FIGS. 7 to 9, the gripper 308 further includes a gripping chamber 332 deposited at the docking end 320b of the housing 320. The gripping chamber 332 is a substantially cylindrical member that extends between an attachment end 332a (where the gripping chamber engages the docking end 320b of the housing 320) and a deformation end 332b (where the gripping chamber holds the fastening device during the fixation process). The gripping chamber 332 includes a central conduit 332c having a longitudinal axis in common with the longitudinal axes of the gripper 308 and the finger 324. The central conduit 332c allows free movement of the finger 324 between the gripping position and the finger deformation position. The positioning of the finger 324 relative to the conduit 332c allows for a profile in the gripping chamber 332 corresponding to the profile of the holding wall 14 of the fastening device 10. In this manner, the holding of the fastening device 10 is ensured without deformation of the sole 12. It is understood that the gripping chamber 332 may be removable so that gripping chambers having different profiles may be used with the same gripper.

Referring again to FIGS. 7 through 9 and further to FIGS. 10, 10A, 10B, and 10C, the deformation end 332b of the gripping chamber 332 includes a footprint 334 where the gripper 308 makes contact with the top surface 12b of the sole 12 of the fastening device 10. The footprint 334 includes a predefined area that corresponds to an area of the top surface 12b of the sole 12. The footprint 334 is provided either in an integrated manner with the gripping chamber 332 or in a replaceable form that allows for exchange of the footprint in correspondence with the profile of the fastening device 10. The footprint is made of a material selected from known materials, including rubber materials. In replaceable embodiments of the footprint 334, the footprint 334 may be selected from rubber footprints with a wide clearance corresponding to the fastening device 10 (see FIG. 10), and three-dimensional (or "3D") printed footprints with a wide clearance (see FIG. 10A), medium clearance (see FIG. 10B), or reduced clearance (see FIG. 10C). The footprints shown in the figures are illustrative and may be modified based on the profile of the fastening device 10.

The gripper 308 may further include a known sensor(s) that provides control of the gripper during the fixation process. As an example, the gripper may include one or more distance sensors (for example, see sensor 340 in FIG. 8). Such sensors detect either the optimal distance between the gripper 308 and the fastening device 10 (providing for a vacuum during gripping of the fastening device) or the optimal distance between the gripper 308 and the inner surface 50a of the casing 50 (providing for fixation of the fastening device 10). The gripper 308 may also include displacement sensor(s) (not shown) that detect, for example, the displacement of the control and deformation actuators 328c, 330c so that the reciprocating movement of the actuators (e.g., its speed and/or its degree) is adjusted.

Referring again to FIGS. 1, 2 and 4 to 9 and further to FIGS. 11 to 16, a detailed description is given as an example of an embodiment of a fixation process (or "process") of the invention performed by the installation 100. It is understood that the process can be easily adapted for all embodiments of the installation 100 (including all embodiments of the positioning device 200 and the fixation device 300).

In initiating the fixation process of the invention, the process includes a step of positioning the selected casing 50 for installation at the positioning device 200. During this step, the casing 50 is installed at the positioning device 200 in a substantially rotatable manner so that a known sensor or sensors detect whether the casing is properly installed. The casing 50 is properly installed when the casing assumes an intended position where the predetermined location of the inner surface 50a is positioned to receive the fastening device 10 (see FIG. 6). The data obtained by the sensor(s) can be used to compare the sensed position (representing the position of the casing at the positioning device 200) and the intended position (representing the position where the casing 50 is properly installed). If there is a discrepancy between the sensed position and the intended position, the positioning device 200 can adjust the positioning of the casing 50. This adjustment is accomplished by rotating the casing 50 via the rotating means until it reaches the intended position. The adjustment of the position of the casing 50 along a circumferential path is performed by the lower and upper rollers 202a, 202b. During this step, stopping of rotation of the casing 50 is contemplated and this stopping is detected by the sensor(s).

It is conceivable that the detection and comparison steps may be performed iteratively. In embodiments of the process of the invention, the data obtained may feed a neural network(s) that manages the installation 100 and/or a system (s) in which the installation 100 is incorporated.

The fixation process also includes a preparation step during which the casing 50 and the fastening device are prepared in advance of a contact between the two. During this step, the inner surface 50a of the casing 50 and the front surface 12a of the sole 12 of the fastening device 10 are treated by a treatment means known for treating and cleaning rubber surfaces. This step may be performed either in a simultaneous manner (where the casing and the fastening device are treated substantially at the same time by the treatment means) or in a divided manner (where the treatment of the casing and the fastening device are performed in two spaced-apart steps).

In one embodiment of the process, the processing means used during the preparation step includes one or more lasers. The lasers are selected from commercially available types of lasers having various parameters (e.g., pulse frequency, power, and laser direction). During this step, the laser(s) are positioned at an optimal distance to perform the cleaning or other treatment of the surface of interest (either the inner surface 50a of the casing 50 or the front surface 12a of the sole 12). In embodiments using lasers, a suction for the dust associated with the laser treatment may be incorporated so as not to contaminate either the casing 50 or the prepared sole 12. It is understood that other treatment means may be employed to treat the casing 50 and the sole 12 (for example, chemical and/or mechanical treatments).

Figure 11:
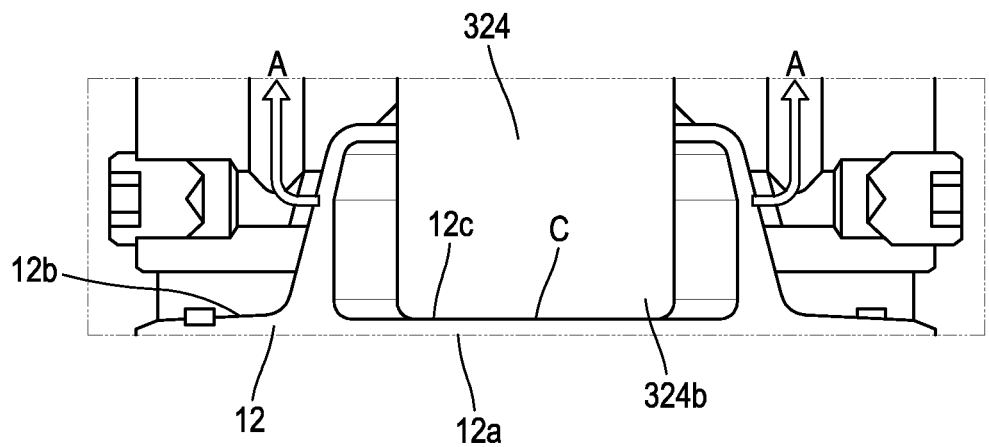
FIGS. 11 through 16 represent steps of an embodiment of a fixation process of the invention.

Referring to FIGS. 8 and 11, the fixation process further includes a moving and holding step during which the robot 302 controls the movement of the gripper 308 and the holding of the fastening device 10. During this step, the robot 302 moves the gripper 308 toward the fastening device 10 so that the footprint 334 of the gripping chamber 332 engages the top surface 12b of the sole 12 of the fastening device. The gripper 308 is evacuated during this step to hold the holding wall 14 of the fastening device 10 such that the center C is aligned along the longitudinal axis of the finger 324 (i.e., concentrically). The vacuum is maintained during the process time to ensure uninterrupted retention of the fastening device 10 in the gripping chamber 332 (see arrows A in FIG. 11). In embodiments of the process, the step of preparing the sole 12 of the fastening device 10 is performed during this step (e.g., by processing the sole 12 while holding the fastening device by the gripper 308).

The moving and holding step of the fixation process includes a step of moving the gripper 308 between the standby position (see FIG. 2) and the docking position (see FIG. 6). This step includes an alignment between the front surface 12a of the sole 12 of the fastening device and the predetermined location of the inner surface 50a of the casing 50. This alignment may be achieved within a predefined tolerance by a known measuring means (e.g., by laser). In one embodiment of the process, the predetermined location includes a substantially circular geometry requiring concentric alignment of the predetermined location and the fastening device 10. A vacuum is maintained in the gripper 308 for the duration of this step.

The fixation process further includes a bonding step during which a predetermined amount of adhesive is applied to the front surface 12a of the sole 12 of the fastening device 10. In embodiments of the method, the application of the adhesive may be controlled in a serpentine pattern to allow air to escape between the sole 12 and the inner surface 50a during docking of the fastening device 10. The adhesive is selected from known types of adhesives, including, without limitation, methacrylate, cyanoacrylate, acrylic, epoxy and their equivalents.

Figure 12:
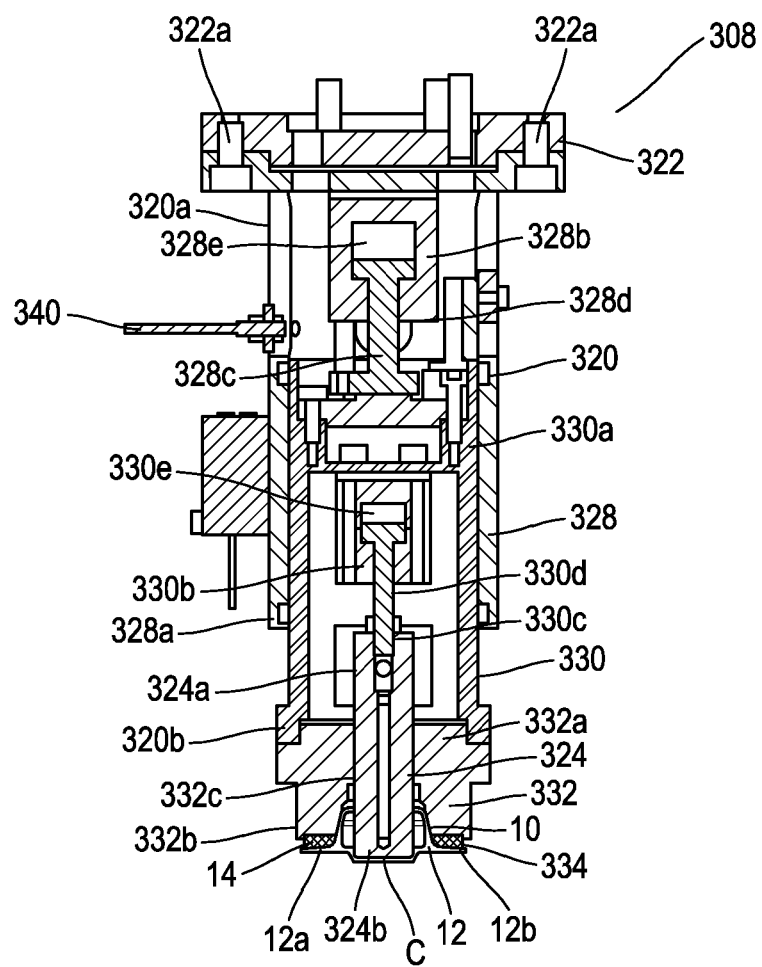
Figure 13:
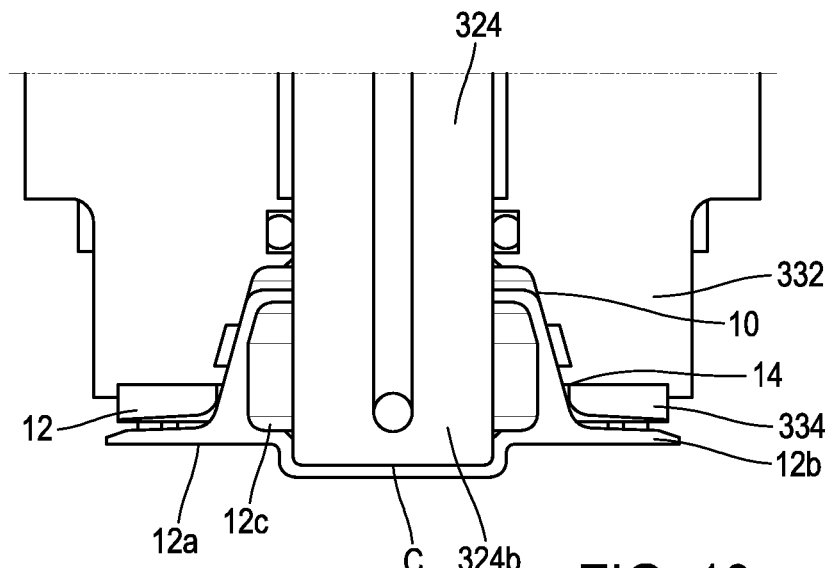

Referring to FIGS. 12 and 13, the fixation process further includes, after the completion of the bonding step, a deforming step during which the finger 324 moves to deform the fastening device 10 at the center C. This step is performed after the casing 50 and the fastening device 10 are aligned. During this step, the piston 330c of the sliding housing 330 moves within the chamber 330e to reciprocate the deformation actuator 330b from the gripping position (see FIG. 8) to the deformation position (see FIG. 12). Accordingly, the deformation end 324b of the finger 324 extends through the central conduit 332c of the gripping chamber 332 until it engages the bottom 12c of the flange 12 at the center C of the fastening device 10. The finger 324 extends beyond the deformation end 332b of the gripping chamber 332 to deform the center C of the fastening device 10. During this step, the control actuator 328c assumes the extended position, and a vacuum is maintained so that a circumferential periphery of the sole 12 remains in engagement with the footprint 334 of the gripper 308 (see FIG. 13).

Referring again to FIGS. 12 and 13, the fixation process further includes a docking and placement step during which the robot 302 (and particularly the gripper 308) presents the attachment device 10 to the casing 50. By initiating this step, the front surface 12a of the sole 12 and the inner surface 50a of the casing 50 are already prepared.

During this step, the robot 302 moves the gripper 308 into position on the casing 50 with the extended finger 324. As a result, the finger 324 deforms the already bonded flange 12, ensuring that the center C of the flange 12 and the predetermined location in the inner surface 50a of the casing 50 are uniformly contacted (or "docked"). During docking, the sole 12 of the fastening device 10 can conform to the relief of the inner surface 50a of the casing 50 as well as its irregularities, regardless of the size and geometry of the casing. During this step, the control actuator 328c remains in the extended position, and a vacuum is maintained so that the gripper 308 can hold the fastening device 10 (see FIG. 13).

Figure 14:
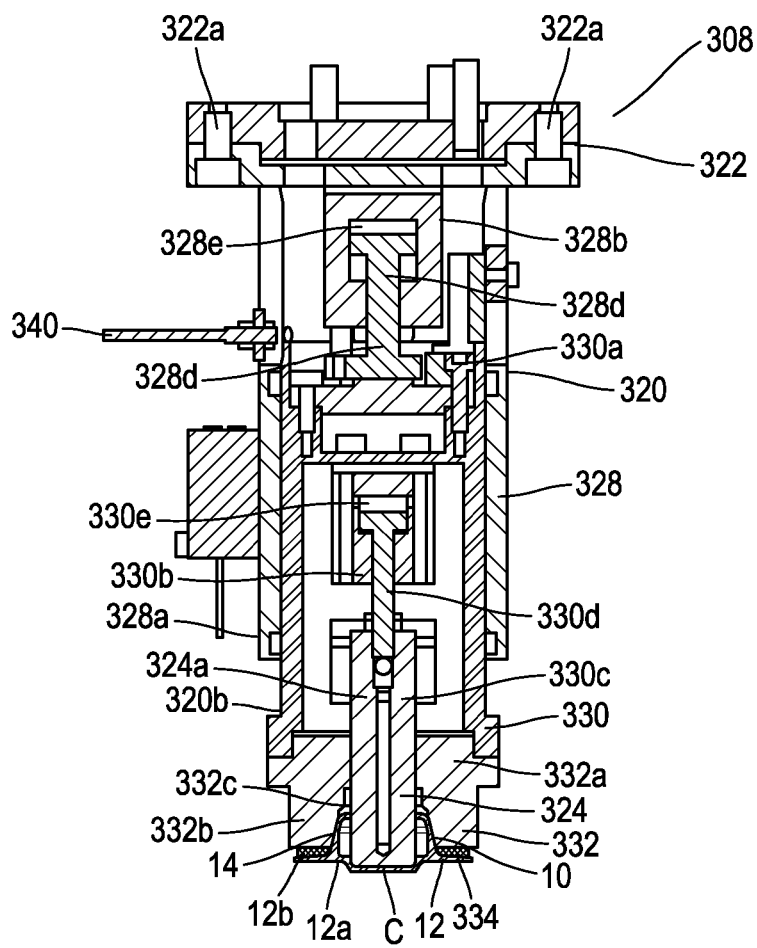

Referring to FIG. 14, the docking and positioning step includes a step of pressing the fastening device 10 along the circumferential perimeter of the sole 12. During this step, the piston 328c of the control actuator 328b moves within the chamber 328e to reciprocate the sliding housing 330 from the extended position (see FIG. 12) to the retracted position (see FIG. 14). During this step, the deformation actuator 330c maintains the extended position of the finger 324, allowing for a light placement due to a flexible interface between the finger 324 and the bottom 12c of the sole 12. During this step, a vacuum is maintained so that a circumferential periphery of the sole 12 remains in engagement with the footprint 334 of the gripper 308. Thus, the gripper footprint 334 engages the upper surface 12b of the sole 12 to apply uniform pressure along the sole.

Figure 15:
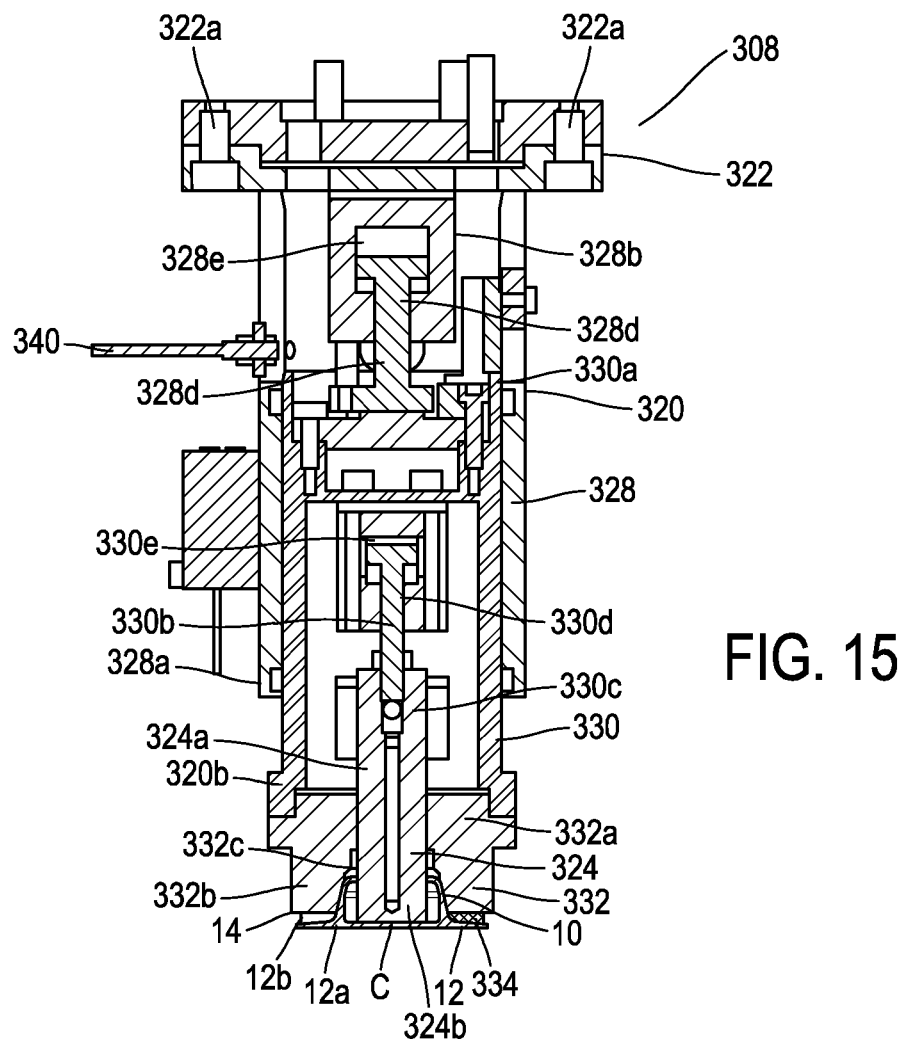
Figure 16:
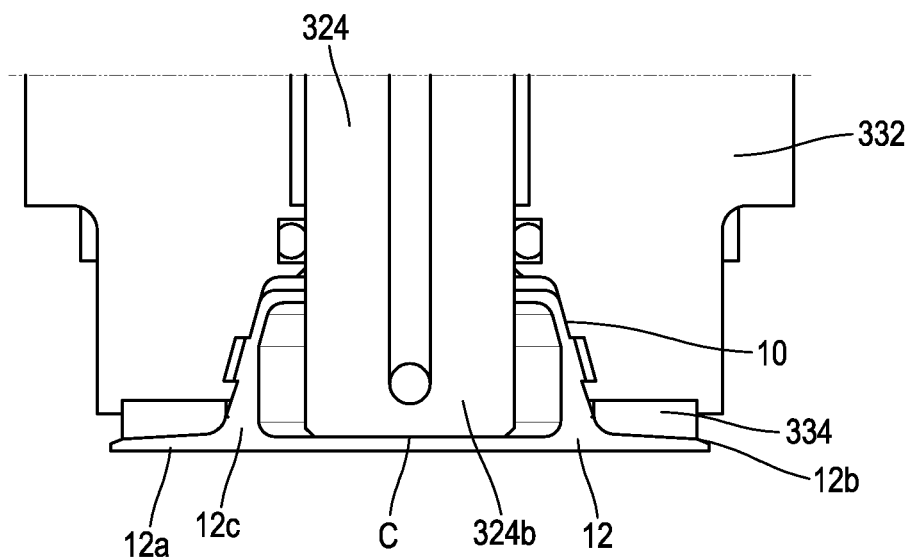

Referring further to FIGS. 15 and 16, the docking and placement step further includes a rotation step during which the robot 302 rotates the gripper 308 to distribute the adhesive applied to the front surface 12a of the fastening device 10. This step is performed during the step of pressurizing the fastening device 10. During this step, the piston 328d of the control actuator 328b moves within the chamber 328e of the fixed housing 328 to reciprocate the sliding housing 330 from the retracted position (see FIG. 14) to the extended position (see FIG. 15). During this step, a vacuum is maintained, and the deformation actuator 330b moves to reciprocate the finger 324 from the deformation position (see FIG. 12) to the gripping position (see FIG. 15). Thus, uniform pressure is maintained along the sole 12 as the finger 324 presses the bottom 12c at the center C of the fastening device 10, evenly distributing the adhesive applied to the front surface 12a of the sole. In embodiments of the process, approximately 45° of rotation is applied by the robot 302 during this step. It is understood that the rotation may be varied depending on the properties of the adhesive and rubber material of the fastening device 10.

Referring to FIGS. 8, 15 and 16, the fixation process includes a final step of resuming the standby position performed by the gripper 308. During this step, the gripper 308 resumes the standby position, and the finger 324 remains in the gripping position (see FIG. 8). During this step, the vacuum is stopped in the gripper 308 to release the holding wall 14 of the fastening device 10. At the end of this step, fixation of the fastening device 10 on the casing 50 is performed precisely at the predetermined location of the front surface 50a of the casing.

After completion of the last step, the fixation process can be restarted. It is understood that some of the steps of the process, as well as the process itself, may be performed in an iterative fashion depending on the number of fastening devices scheduled for fixation. The installation 100 may be programmed so that the positioning device 200 and the fixation device 300 control the positioning of the casing 50 and the fastening device 10 substantially automatically. The time between each process step is thus controlled to achieve reliable cycle time reproducibility.

The installation 100 is suitable for mounting a variety of fastening devices that are composed of a variety of rubber compounds, without decreasing industrial productivity. Therefore, the invention takes into account the quality of the parameters measured and transmitted by the electronic device arranged in the fastening device 10 to ensure the quality of the services offered with them.

The fixation process of the invention can be done by the PLC control and can include pre-programming of control information. For example, a process setting may be associated with the parameters of the casing 50 and/or the fastening device 10, the properties of the adhesive applied to the sole 12, and the operating parameters of the electronic device.

In embodiments of the invention, the installation 100 (and/or a system that incorporates the installation 100) may receive voice commands or other audio data representing, for example, a start or a stop of a vacuum in the gripper 308. The command may include a request for the current status of a fixation process cycle. A generated response may be represented audibly, visually, tactilely (for example, using a haptic interface), and/or by virtual or augmented means.

In one embodiment, the process may include a step of training the installation 100 (or training a system that incorporates the installation 100) to recognize values representative of predetermined locations of the fastening device 10 within the casing 50 (e.g., circumferential and radial values along the interior surface 50a) and to make a comparison with target values. This step may include the step of training the installation 100 (including training the positioning device 200 and the fixation device 300) to recognize non-equivalences between the compared values. Each step of the training includes a classification generated by self-learning means. This classification may include, but is not limited to, the parameters of the rubber materials of the fastening devices used, the configurations of the grippers, the durations of the process cycles, and the expected values at the end of a cycle in progress.

For all embodiments of the installation 100, a monitoring system could be implemented. At least a portion of the monitoring system may be provided in a wearable device such as a mobile network device (e.g., a cell phone, a laptop computer, a network-connected wearable device(s) (including "augmented reality" and/or "virtual reality" devices, network-connected wearables and/or any combinations and/or equivalents). It is conceivable that detection and comparison steps can be performed iteratively.

The terms "at least one" and "one or more" are used interchangeably. Ranges that are presented as being "between a and b" include both "a" and "b" values.

Although particular embodiments of the disclosed apparatus have been illustrated and described, it will be understood that various changes, additions, and modifications may be practiced without departing from the spirit and scope of this disclosure. Accordingly, no limitations should be imposed on the scope of the described invention except those set forth in the appended claims.

The invention claimed is:

1. A preparation and fixation installation for fixation of a fastening device to an inner surface of a tire casing, the fastening device comprising a sole substantially cylindrical with respect to a center through which an axis of rotation passes, the sole having a front surface and an opposite top surface from which a retaining wall extends and terminates in an opening allowing an electronic member to be mounted in a space delimited by a bottom and an inner wall, the installation comprising:
- a positioning device that controls positioning of the casing, the positioning device having a fixed support and one or more rotating means that guide rotation of the casing about its axis of rotation; and
- a fixation device that performs fixation of the fastening device to a predetermined location of the inner surface of the casing,
- wherein the fixation device comprises:
  - a robot having a gripping device supported by an elongated arm that pivots and extends from the elongated arm to a free end; and
  - a gripper disposed along a longitudinal axis 1-1 at the free end of the gripper device that effects movement of the fastening device between a standby position, where the gripper holds the fastening device by the retaining wall without deformation, and a docking position, where the gripper moves the fastening device toward the envelope to effect docking thereof at the predetermined location of the inner surface of the casing, and
- wherein the gripper comprises
  - a housing comprising a fixed housing and a sliding housing disposed along the longitudinal axis 1-1 of the gripper, the housing having a predetermined length between an attachment end, where removable attachment of the housing to the robot is achieved, and a docking end, where docking of the fastening device to the casing is achieved; and
  - a docking finger having a longitudinal axis in common with the longitudinal axis 1-1 of the gripper, the finger having a predetermined length that extends between an actuation end, where a reciprocating movement of the finger is performed, and an opposite deformation end, where an engagement is performed between the finger and the center of the fastening device aligned along the longitudinal axis of the finger where a vacuum is applied to the gripper.

2. The installation of claim 1, wherein the fixed housing of the housing extends between the attachment end of the housing and an opposite end to define a space into which the sliding housing extends and into which a control actuator is disposed that reciprocates to effectuate corresponding movement of the sliding housing, along the longitudinal axis 1-1, between an extended position, where the sliding housing extends relative to the fixed housing, and a retracted position, where the sliding housing retracts relative to the fixed housing, and
wherein the sliding housing of the housing extends into the space of the fixed housing between an activation end disposed adjacent the opposite end of the fixed housing and the docking end to define a space in which the finger extends and in which a deformation actuator is disposed that reciprocates to effect a corresponding movement of the finger between a gripping position where the fastening device is held by the gripper in the standby position, and a deformation position, where the finger engages the center of the fastening device.

3. The installation of claim 2, wherein the gripper further comprises a gripper chamber disposed at the docking end of the housing, the gripper chamber comprising:
- a substantially cylindrical member that extends between an attachment end, where the gripping chamber engages the docking end of the housing, and a deformation end having a footprint where the gripper makes contact with the top surface of the sole of the fastening device; and
- a central conduit having a longitudinal axis in common with the longitudinal axes of the gripper and the finger, and
- wherein the central conduit allows free movement of the finger between the gripping position and the deformation position of the finger, such that the positioning of the finger relative to the central conduit allows for a profile in the gripping chamber corresponding to the profile of the retaining wall of the fastening device.

4. The installation of claim 1, wherein the fixation device further comprises a vacuum control system comprising:
- at least one vacuum generator that provides a vacuum to the gripper;
- one or more manifolds that manage delivery of the vacuum to the gripper; and
- one or more pressure regulators that allow adjustment of a pressure of the vacuum supplied to the gripper.

5. The installation of claim 1, wherein the rotating means comprises a lower roller or rollers on which the casing is mounted and an upper roller or rollers held in an elevated position by a frame of the stationary support, with each lower and upper roller assuming a substantially conical geometry that engages a respective flank of the casing.

6. The installation of claim 1, wherein the positioning device further comprises at least one treatment means that treats the inner surface of the casing and the front surface of the sole of the fastening device prior to a contact between the two.

7. The installation of claim 6, wherein the treatment means comprises at least one laser and a means for suctioning dust associated with the at least one laser.

8. A fixation process performed by the installation of claim 1, the fixation process comprising the following steps:
- a step of positioning the casing during which the casing is installed at the positioning device in a substantially rotatable manner where the casing assumes an intended position;
- a moving and holding step during which the robot performs an alignment between the front surface of the sole of the fastening device and the predetermined location of the inner surface of the casing, this step including a step of moving the gripper between the standby position and the docking position;
- a bonding step during which a predetermined amount of adhesive is applied to the front surface of the sole of the fastening device;
- a deforming step during which the finger is moved to deform the fastening device, this step being performed after the moving and holding and bonding steps;
- a docking and contacting step during which the robot moves the gripper into position on the casing with the finger extended so that the finger can engage the center of the fastening device; and
- a step of resuming the standby position performed by the gripper, during which the finger remains in the gripping position and the gripper releases the retaining wall of the fastening device,
wherein a vacuum is applied to the gripper for the duration of the process until a recovery step.

9. The fixation process of claim 8, wherein the docking and contacting step comprises the following steps:
- a step of pressing the fastening device along a circumferential perimeter of the sole; and a rotation step during which the robot rotates the gripper to distribute the adhesive applied to the front surface of the fastening device, this step being performed while the fastening device is being pressed.

10. The process of claim 8, further comprising a preparation step during which the inner surface of the casing and the front surface of the sole of the fastening device are treated by a treatment means comprising at least one laser.

11. The process of claim 8, wherein a step or steps of the method are performed iteratively.

* * * * *